US006818854B2

(12) United States Patent
Friedman et al.

(10) Patent No.: US 6,818,854 B2
(45) Date of Patent: Nov. 16, 2004

(54) LASER PEENING WITH FIBER OPTIC DELIVERY

(75) Inventors: Herbert W. Friedman, Oakland, CA (US); Earl R. Ault, Livermore, CA (US); Karl F. Scheibner, Tracy, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 10/243,208

(22) Filed: Sep. 13, 2002

(65) Prior Publication Data

US 2003/0052103 A1 Mar. 20, 2003

Related U.S. Application Data

(60) Provisional application No. 60/322,521, filed on Sep. 14, 2001.

(51) Int. Cl.[7] ........................ B23K 26/00; B23K 26/36
(52) U.S. Cl. .......................... 219/121.6; 219/121.68; 219/121.78
(58) Field of Search .................. 219/121.6, 121.68, 219/121.69, 121.78, 121.84, 121.85

(56) References Cited

U.S. PATENT DOCUMENTS

| 4,937,421 A | * | 6/1990 | Ortiz et al. ............. 219/121.68 |
| 5,131,957 A | | 7/1992 | Epstein et al. |
| 5,333,077 A | | 7/1994 | Legar et al. |
| 5,436,990 A | | 7/1995 | Head et al. |
| 5,617,492 A | | 4/1997 | Beach et al. |
| 5,911,891 A | | 6/1999 | Dulaney et al. |
| 5,978,407 A | | 11/1999 | Chang et al. |
| 6,064,035 A | | 5/2000 | Toller et al. |
| 6,078,022 A | * | 6/2000 | Dulaney et al. ........ 219/121.85 |
| 6,127,649 A | | 10/2000 | Toller et al. |
| 6,198,069 B1 | | 3/2001 | Hackel et al. |
| 6,288,358 B1 | * | 9/2001 | Dulaney et al. ......... 219/121.6 |
| 6,410,884 B1 | | 6/2002 | Hackel et al. |

OTHER PUBLICATIONS

Sano, Y., et al., "Development and Application of Laser Peening System to Prevent Stress Corrosion Cracking of Reactor Core Shroud," ICONE–8441, Proceedings of ICONE 8, 8th Int'l Conference on Nuclear Engineering, Apr. 2–6, 2000, Baltimore, MD, USA, pp. 1–10.

Fabbro, R. et al., "Physics and Applications of Laser–Shock Processing," Journal of Laser Applications, vol. 10, No. 6, Dec. 1998, pp. 265–279.

Sano, Y., et al., "Residual Stress Improvement Mechanism on Metal Material by Underwater Laser Irradiaiton," Kaz Transpacific, vol. 42, No. 6, (2000), pp. 93–99.

* cited by examiner

Primary Examiner—Samuel M. Heinrich
(74) Attorney, Agent, or Firm—Eddie E. Scott; Alan H. Thompson

(57) ABSTRACT

A system for processing a workpiece using a laser. The laser produces at least one laser pulse. A laser processing unit is used to process the workpiece using the at least one laser pulse. A fiber optic cable is used for transmitting the at least one laser pulse from the laser to the laser processing unit.

39 Claims, 7 Drawing Sheets

LASER PEENING WITH FIBER OPTIC DELIVERY

CROSS-REFERENCE TO RELATED APPLICATIONS

This application claims the benefit of U.S. Provisional Application No. 60/322,521, filed Sep. 14, 2001, titled "Laser Peening with High Average Power Lasers and Fiber Optic Delivery Systems." U.S. Provisional Application No. 60/322,521, filed Sep. 14, 2001, titled "Laser Peening with High Average Power Lasers and Fiber Optic Delivery Systems" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to laser peening and more particularly to laser peening with fiber optic delivery.

2. State of Technology

U.S. Pat. No. 5,131,957 to Harold M. Epstein for material properties, issued Jul. 21, 1992 provides background information, "The interaction of a pulsed laser beam with the surface of a material gives rise to a pressure pulse (shock wave) that propagates into the material and changes its properties. In the case of metals, for example, the changes in properties are caused by the introduction of cold work that increases the hardness and strength of the material. By appropriate tailoring of the peak pressure and width of the shock wave, it is possible to enhance selected material properties, such as fatigue strength, and at the same time not adversely affect other properties, such as corrosion resistance. It is possible also to shock process a finished piece of material without disturbing its surface, where a thin sacrificial layer of overlay material has been attached intimately onto the surface of the workpiece."

U.S. Pat. No. 5,911,891 to Jeff L. Dulaney, et al. for laser shock peening with tailored multiple laser beams, issued Jun. 15, 1990 provides background information, "Method of changing the residual compressive stresses of an area of a workpiece by tailoring multiple laser beams applied to the workpiece. In one embodiment, a relatively long duration laser pulse is applied to the workpiece followed by a relatively short duration laser pulse. Other tailoring embodiments used to increase the total residual compressive stress of workpieces include blending two laser pulses, or splicing them utilizing a first short sliced-type beam combined with a relatively long duration, high powered gaussian laser beam pulse. A third embodiment utilizes two or more laser beams or pulses of different wavelengths."

U.S. Pat. No. 6,410,884 to Lloyd Hackel and Harris Fritz for contour forming of metals by laser peening issued Jun. 25, 2002 provides background information, "Improving the strength of metals by cold working undoubtedly was discovered early in civilization, as ancient man hammered out his weapons and tools. Since the 1950s, shot peening has been used as a means to improve the fatigue properties of metals. Another method of shock processing involves the use of high explosive materials in contact with the metal surface. The use of high intensity laser outputs for the generation of mechanical shock waves to treat the surfaces of metals has been well known since the 1970s. The laser shock process can be used to generate compressive stresses in the metal surfaces adding strength and resistance to corrosive failure."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for processing a workpiece using a laser unit. The laser unit produces at least one laser pulse. A laser processing system is used to process the workpiece using the at least one laser pulse. A fiber optic cable system is used for transmitting the at least one laser pulse from the laser system to the laser processing unit. In one embodiment a multiplicity of individual lasers are used and the fiber optic cable system includes a corresponding multiplicity of individual optical fibers for transmitting the at least one laser pulse. In one embodiment the laser system is an array of low pulse energy but high repetition rate lasers. In one embodiment the laser system produces a laser beam. A fiber optic bundle is used for delivering the laser beam to the workpiece. In one embodiment the laser system uses water to cover at least a portion of the workpiece. In one embodiment the workpiece is under the water. In one embodiment the laser processing unit is a laser peening system. In one embodiment the laser peening system uses water to cover at least a portion of the workpiece. In one embodiment the workpiece is under the water. In one embodiment the laser peening system uses a laser pulse of green wavelength. In one embodiment the laser pulse of green wavelength is used to laser peen the workpiece under the water.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
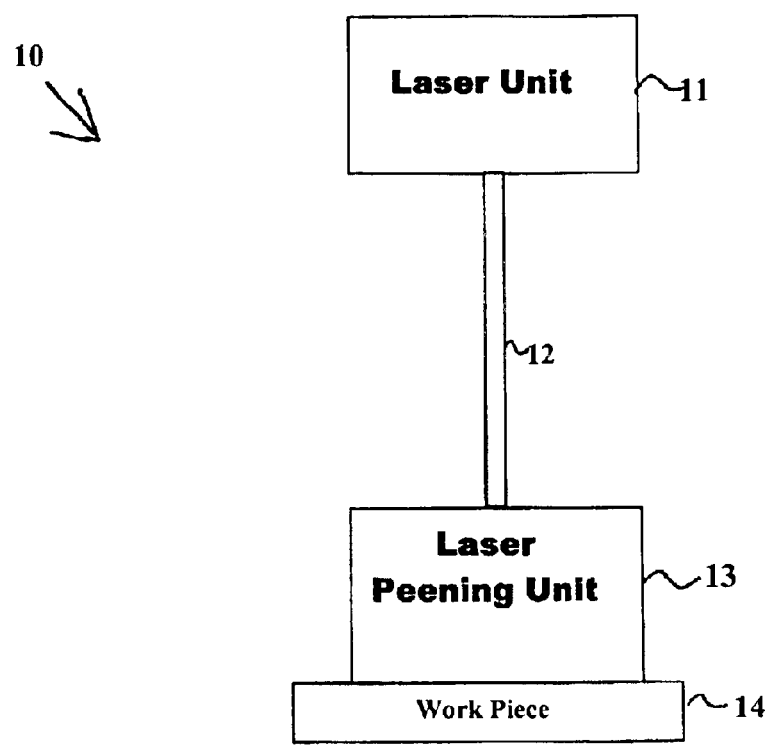
FIG. 1 illustrates system for processing a workpiece using a laser unit.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, a schematic diagram of a system illustrating an embodiment of the invention is shown. The system is designated generally by the reference numeral 10. Improving the strength of metals by cold working undoubtedly was discovered early in civilization, as ancient man hammered out his weapons and tools. Since the 1950s shot peening has been used as a means to improve the fatigue properties of metals. Another method of shock processing involves the use of high explosive materials in contact with the metal surface. The use of high intensity laser outputs for the generation of mechanical shock waves to treat the surfaces of metals has been well known since the 1970s. The laser shock process can be used to generate compressive stresses in the metal surfaces adding strength and resistance to corrosive failure.

Using high power lasers to improve material properties is an important industrial application of lasers. Lasers can transmit controllable beams of high energy radiation for metalworking. The laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high speed manufacturing. The fact that the beam can be controlled allows parts having complex shapes to be processed. Also accuracy, consistency, and repeatability are inherent to the system.

The system 10 uses a laser unit 11 for processing a workpiece 14. The laser unit 11 produces at least one laser pulse. A laser processing unit 13 processing the workpiece 14 using the at least one laser pulse. A fiber optic system 12 transmits the at least one laser pulse from the laser unit 11 to the laser processing unit 13. The laser unit 11 comprises at least one individual laser and the fiber optic system comprises at least one optical fiber for transmitting the at least one laser pulse.

Figure 2:
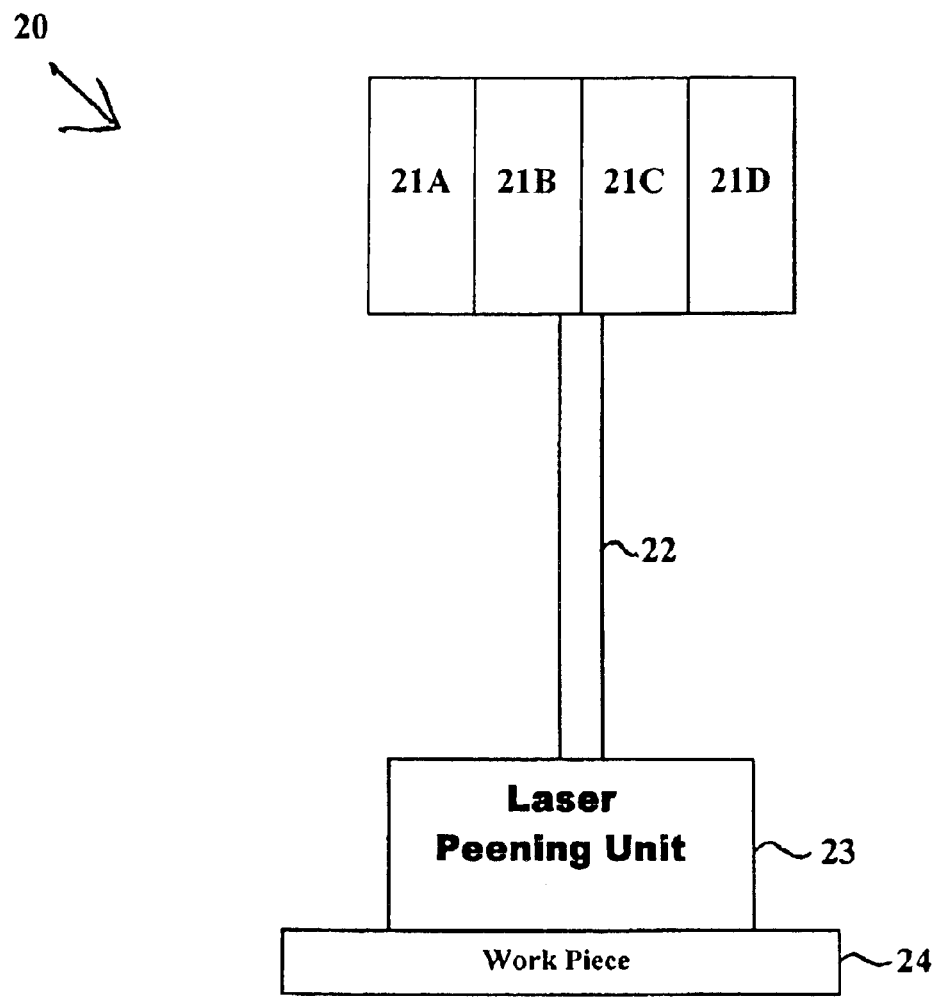
FIG. 2 illustrates system for processing a workpiece using a multiplicity of individual lasers and a fiber optic system.

Referring now to FIG. 2, a schematic diagram of a system illustrating another embodiment of the invention is shown. The system is designated generally by the reference numeral 20. The system 20 includes a multiplicity of lasers 21A, 21B, 21C, and 21D. The lasers 21A, 21B, 21C, and 21D comprise an array of low pulse energy but high repetition rate lasers. The lasers produce laser pulses of green wavelength. The laser pulses of green wavelength are used to laser peen the workpiece 24. A laser peening unit 23 is included for processing a workpiece 24 using laser pulses from of lasers 21A, 21B, 21C, and 21D. The laser peening unit 23 contains water. At least a portion of the workpiece 24 is under the water. A fiber optic cable 22 is used to transmit the laser pulses from the lasers 21A, 21B, 21C, and 21D to the laser peening unit 23. The fiber optic cable 22 comprises a multiplicity of individual optical fibers for transmitting the laser pulses.

The system 20 processes a workpiece 24 using a laser unit consisting of lasers 21A, 21B, 21C, and 21D. The lasers unit produce laser pulses. A laser processing unit 23 is used to process the workpiece 24 using the laser pulses. A fiber optic cable system 22 is used for transmitting the laser pulses from the lasers to the laser processing unit 23. A multiplicity of individual lasers 21A, 21B, 21C, and 21D are used and the fiber optic cable system 23 includes a corresponding multiplicity of individual optical fibers for transmitting the laser pulses. The laser system is an array of low pulse energy but high repetition rate lasers 21A, 21B, 21C, and 21D that produce laser beams. A fiber optic bundle 22 is used for delivering the laser beams to the workpiece. The system 20 uses water to cover at least a portion of the workpiece 24.

Figure 3:
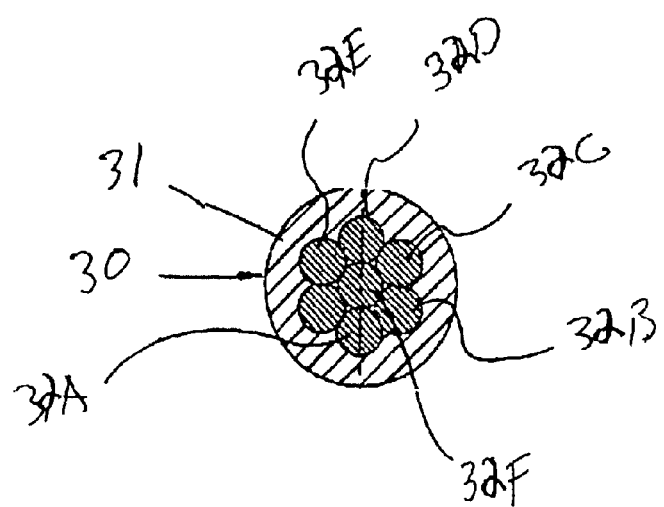
FIG. 3 shows a multiplicity of individual optical fibers for transmitting the laser beam.

Referring now to FIG. 3, a multiplicity of individual optical fibers for transmitting the laser beam are shown. A fiber optic cable, generally designated by the reference numeral 30, is used to transmit the laser pulses from the lasers to the laser peening unit. The fiber optic cable 30 comprises a multiplicity of individual optical fibers 32A, 32B, 32,C, 32D, and 32F. An additional optical fiber or support structure 32F is surrounded by the optical fibers 32A, 32B, 32,C, 32D, and 32F. The optical fibers 32A, 32B, 32,C, 32D, and 32F are contained within a jacket 31.

Figures 4, 5:
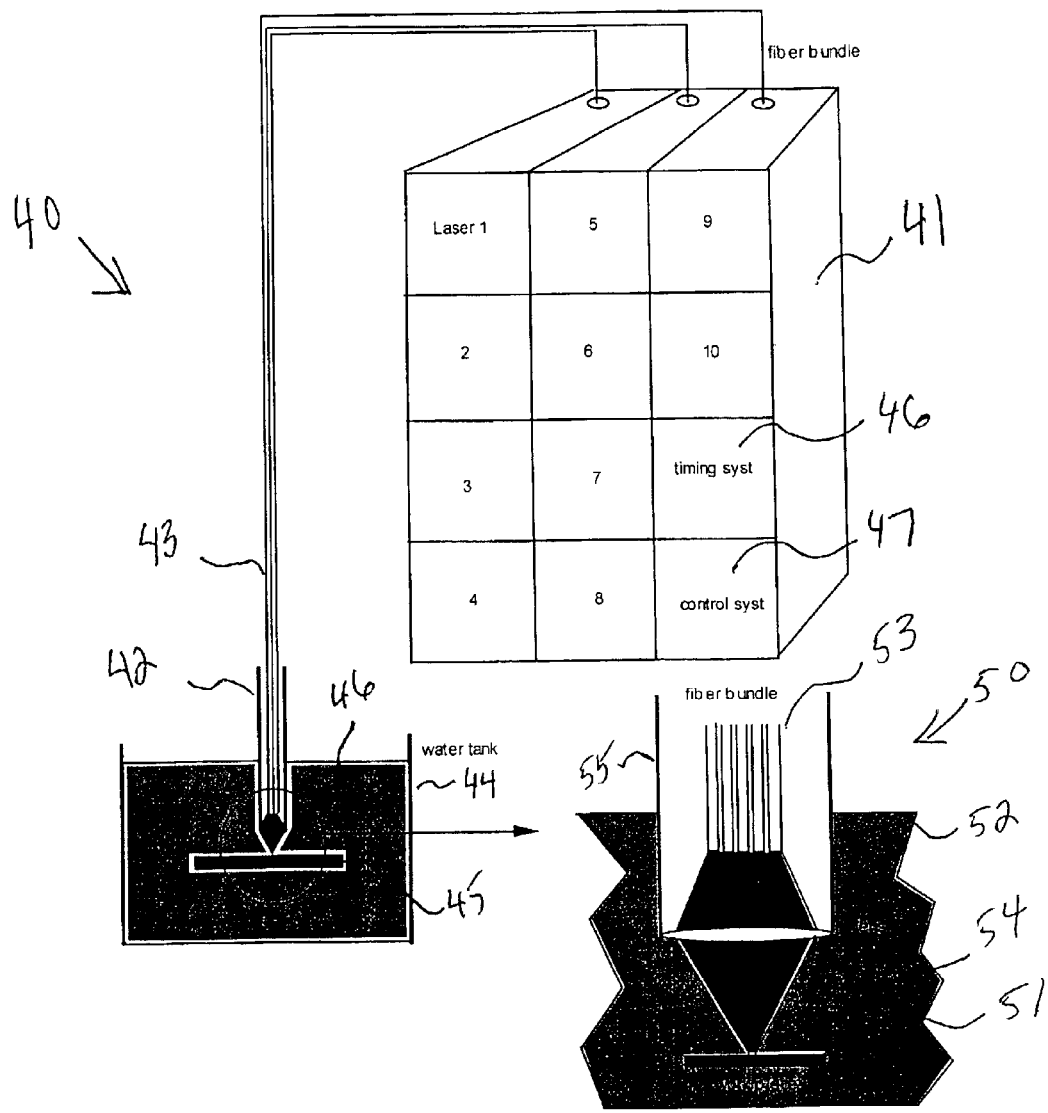
FIG. 4 illustrates a laser peening system using multiple high repetition rate lasers and fiber optic delivery systems.
FIG. 5 illustrates a focusing lens sealed to a tube in which the fiber bundle is placed.

Referring now to FIG. 4, a schematic diagram of a system illustrating another embodiment of the invention is shown. The system is designated generally by the reference numeral 40. The system 40 increases the surface hardness of metals using shock propagation induced by laser pulses. The system 40 includes a laser unit 41 that includes multiplicity of lasers, laser 1 through laser 10. The lasers comprise an array of low pulse energy but high repetition rate lasers. The lasers produce laser pulses of green wavelength. The laser pulses of green wavelength are used to laser peen a workpiece 45. A laser peening unit processes the workpiece 45 using laser pulses from of lasers. The laser peening unit includes a water tank 44 containing water 46. At least a portion of the workpiece 45 is under the water 46. A fiber optic cable 43 is used to transmit the laser pulses from the lasers to the laser peening unit. The fiber optic cable 43 comprises a multiplicity of individual optical fibers for transmitting the laser pulses.

The output of the array of Diode Pumped Solid State Lasers, lasers 1 through laser 10, is launched into the fiber bundle 43 which transports the light to the vicinity of the material 45 to be processed. A lens focuses the light onto the material 45 with a peak flux and fluence capable of launching a shock wave into the material 45. The effect of the laser driven shock is magnified by the liquid layer 46 or tamper adjacent to the surface. If the strength of the shock exceeds the elastic limit, a residual stress is left behind after passage of the shock and the resultant densification hardens the surface. The use of a visible laser allows the water layer 46 to be thick so that immersed surfaces can be treated as in the application of laser peening to prevent stress corrosion cracks in nuclear power plant structures. An example of use of the system 40 is the use of green wavelength to laser peen a workpiece 45 under water 46.

The system 40 uses an array of high repetition rate, high average power lasers coupled to a fiber bundle to achieve peening of metal surfaces. In the system 40, it is assumed that a water layer that in the case of green lasers can be thick, e.g. submersed in water, tamps the metal surface. It is to be understood that near infrared lasers can also be used for peening and in such an embodiment the water taper layer must be kept thin, of the order of a millimeter and the coupling to the metal surface is not as good. The ablation threshold is lower and the pressure generated is higher for shorter wavelengths. This is true as long as the laser intensity is kept below the pressure saturation regime which is caused by laser breakdown in the water layer (which decreases with decreasing wavelength).

Referring now to FIG. 5, a schematic diagram of the workpiece and the systems for laser peening the workpiece are illustrated. The system is designated generally by the reference numeral 50. The system 50 increases the surface hardness of metals using shock propagation induced by laser pulses. The system 50 includes a laser unit that includes multiplicity of lasers. The lasers comprise an array of low pulse energy but high repetition rate lasers. The lasers produce laser pulses of green wavelength. The laser pulses of green wavelength are used to laser peen a workpiece 51. A laser peening unit processes the workpiece 51 using laser pulses from of lasers. The laser peening unit includes a water tank containing water 52. At least a portion of the workpiece 51 is under the water 52. A fiber optic cable 53 is used to transmit the laser pulses from the lasers to the laser peening unit. The fiber optic cable 53 comprises a multiplicity of individual optical fibers for transmitting the laser pulses.

Laser peening has been used to increase fatigue strength and prevent Stress Corrosion Cracks (SCC) in metals with performance exceeding that of conventional mechanical processes. Typically, lasers with high pulse energy (tens of joules) and short duration (nanoseconds) are used to generate high pressure pulses via the phenomenon of surface ablation. These pressure pulses drive shocks into the depth of the metal leaving behind residual stresses and densification that improve the material properties.

These short, high power laser pulses are focused to spots of the order of 0.5 to 5 mm and create fluxes of 1–10 $GW/cm^2$ and fluences of 10's joules/$cm^2$ in the ablation plasma. To increase the plasma pressure and duration, a transparent tamper layer is typically placed in contact with the metal, with the layer being either solid (quartz or sapphire) or liquid (water). Also, a thin sacrificial layer of absorbing material, either black paint or tape, is typically used to act as a thermal sink so that only mechanical forces are imparted to the metal.

A recent development is the use of visible (green) to peen metal surfaces under water. The water 52 here is not to be confused with the thin layer of water often used as a tamper although the water serves that same purpose. For these thin layers, the near infrared wavelength propagates sufficiently well that attenuation is not a problem. For structures submersed in water as in the case of metal shrouds protecting components of nuclear power plants, the water thickness is substantial and the infrared wavelength will not work.

Many researches use large pulse energy lasers in order to achieve the required high flux and fluence over a large spatial extent. The large spots ensure that the shock which is driven into the metal is largely "one dimensional" and that the peening is uniform when the laser is scanned over the surface. The one dimensional aspect is important since the uniformity of the shock will be reduced if the shock expands in three dimensions.

Two effects allow for lower pulse energy lasers to be used. The first is the observation that once above the Hugonoit Elastic Threshold, the residual stresses are spatially additive so that repeated small pulses can impart residual stresses deep into the metal in the same manner as a single large pulse. The second effect is that peening does not require a coherent laser pulse so that an array of laser pulses delivered by fiber optics can increase the spot area to match that of a single large pulse.

In the system 50, the solid state lasers are diode pumped Nd:YAG with internal second harmonic generation and produce 300 W of 532 nm light at repetition rates in the range of 10–30 kHz with pulse duration in the range of 50–100 ns. Each of the ten lasers delivers two equal power beams which are coupled to two, 1000 micron fibers forming a bundle with dimensions of 4 mm×5 mm. The fibers have anti-reflection stub ends that are bonded to the fibers. The loss factor for these fibers consist of a surface loss of 1% per end and a bulk loss of 3% per ten meters (corresponding to a bulk loss of 13 db/km) so that a 10 m fiber bundle would have a loss of only 5%. The output of the fiber bundle is focused to a spot diameter on the metal surface with the appropriate flux and fluence requirements. The focusing lens 54 is sealed to a tube 55 in which the fiber bundle 53 is placed forming a water tight assembly.

As an example of a repetitively pulsed peening system 50, certain results have been analyzed. A pair of repetitively pulsed lasers delivers 120 Hz pulses to a surface submerged in water. The pulse energy is 200 mJ in 5 ns and is focused to a spot of dimensions 0.8 mm×0.8 mm to give a flux and fluence of 6 $GW/cm^2$ and 30 $J/cm^2$, respectively. After dwelling a time equivalent to about 30 pulses, the material is left with residual stresses to a depth of several millimeters. These residual stresses are sufficient to inhibit SCC in nuclear shrouds that are immersed in water. However, due to the low average power of the lasers, the time required to peen the heat affected zone of the welds is several hours.

In order to match these operating conditions, an array of 10 Diode Pumped Solid State Lasers (DPSSL's) are used. These lasers are operated at 300 W at 532 nm and 15 kHz with pulse duration of 50 ns. Published data suggests that the peak plasma pressure in the ablated layer scales with pulse duration, at least for laser fluxes above the ablation threshold. To match the plasma pressure in the data quoted above, the laser flux can be dropped to 0.6 $GW/cm^2$ which is still above the plasma ablation threshold. It should be noted that such a longer pulse may impart higher residual stress in the metal since data suggests the impulse momentum (integral of pressure) is also an important parameter in addition to the peak pressure.

Even if the pressure scales less than linearly with fluence, the pressure at the reduced flux should be adequate to leave a substantial fraction of the maximum residual stress in the material. The peak plasma pressure at a laser intensity of 6 $GW/cm^2$ is ≈40 kbar and only drops to ≈13 kbar at 0.6 $GW/cm^2$. This peak pressure is still ≈3 times higher than the Hugoniot Elastic Limit, HEL. If it requires more than 30 pulses to both increase the residual stress and achieve the same depth of penetration, the higher average power of this laser array will still result in much lower treatment times.

In the system 50 shown in FIG. 5, ten DPSSL's feed a fiber bundle of 20 fibers each delivering 10 mJ per pulse for a total pulse energy of 200 mJ. This operating point corresponds to a DPSSL power of 300 W in the green with PRF of 15 kHz and pulse duration of 50 ns. At a laser intensity of 0.6 $GW/cm^2$, the 200 mJ pulse must be focussed to a spot size of 0.82 mm in accord with the results of the reference quoted above. If for margin, the laser flux is maintained at 1 GW/cm$^2$, the spot size drops only to 0.63 mm. This means that the lens 54 at the end of the fiber bundle need only reduce the area by a factor of 30.

In terms of throughput, the average power of this ten-laser module system is 3 kW. Taking the above example where 30 pulses were needed to treat 0.75 mm$^2$, this laser system could process a square meter in a single hour, a factor of over 100 times faster than that system.

Figure 6:
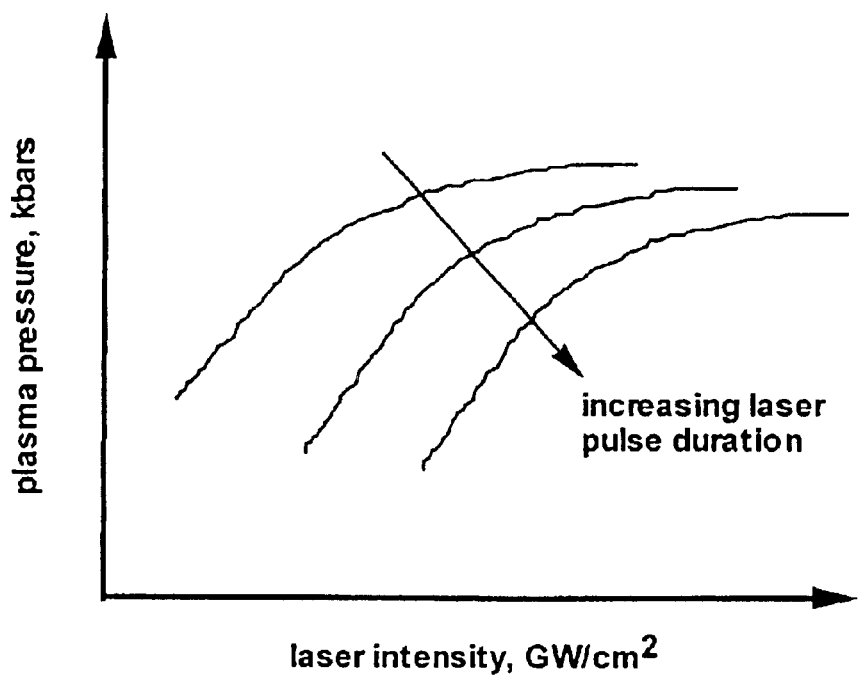
FIG. 6 shows quadratic dependence of plasma pressure on laser intensity.

Although the models needed to do the trade study for the optimum choice of lasers have not all been completed at this point, it is useful to outline the steps of the study:

The peak plasma pressure is dependent upon the square root of the laser intensity, FIG. 6.

Figure 7:
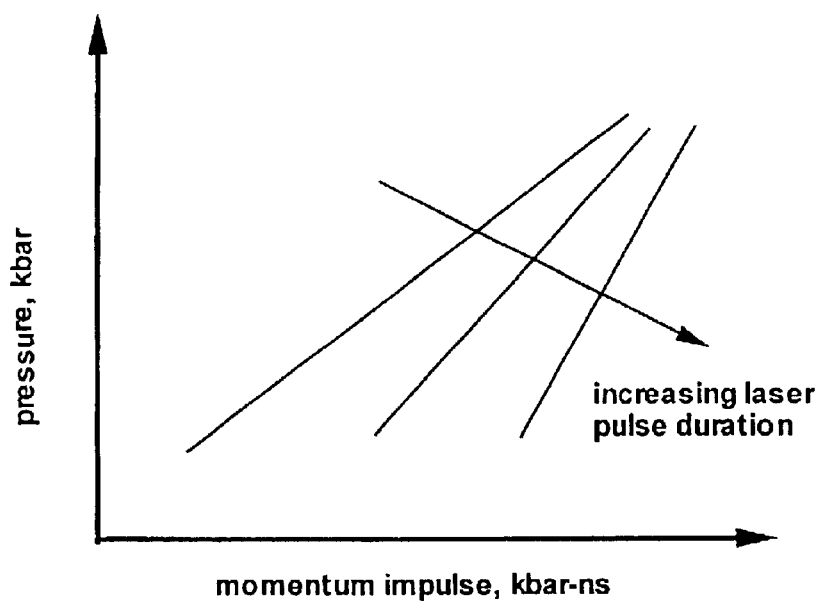
FIG. 7 shows plasma pressure dependence upon the integrated laser intensity or impulse.

The integral of the pressure over time, the momentum impulse, is an important parameter in determining the shock induced stress in the solid material. This parameter has a dependence shown in FIG. 7 with the effect of saturation due to breakdown in the water layer indicated at high laser intensity.

The pressure in the solid material is dependent on the peak laser pressure but more importantly on the impulse.

After the shock has passed the residual stress left in the material at a given depth will rise as the pressure increases but will be capped at a value close to the HEL.

Figure 8:
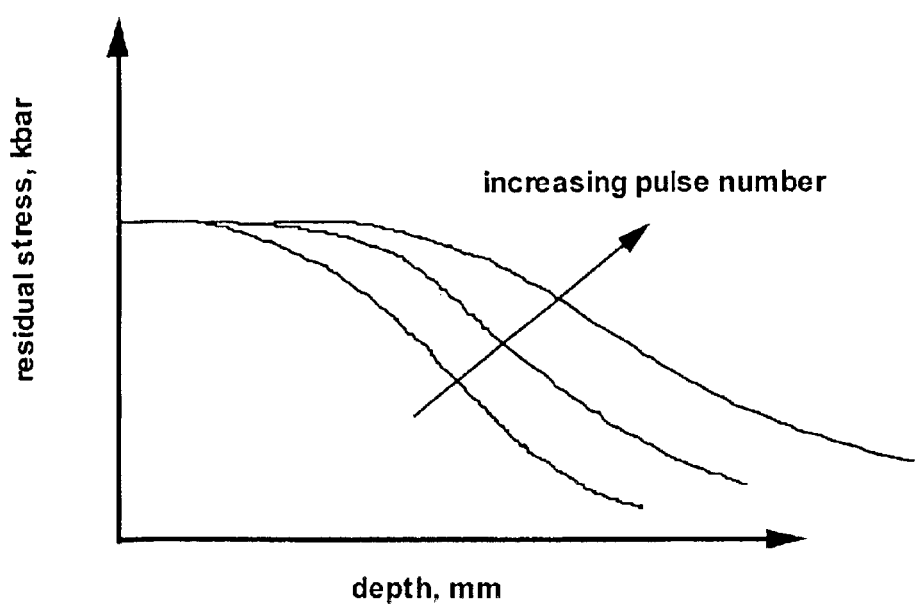
FIG. 8 shows spatial extent of densification due to residual stress.

The penetration depth of the residual stress will vary with the number of pulses overlapped on the same spot as indicated in FIG. 8.

Figure 9:
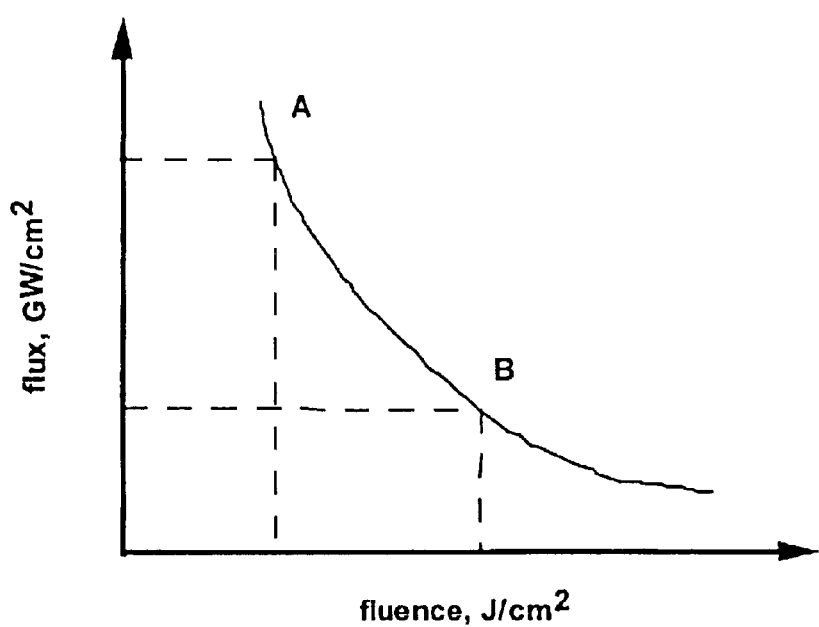
FIG. 9 is a Flux-Fluence map of laser peening operations.

From these plots, a flux-fluence map showing the maximum residual stress can be drawn as indicated in FIG. 9.

The conventional operating mode of laser of laser peening using a single, high flux pulse is shown as point A in FIG. 9, but an equivalent mode is a low flux but high fluence series of pulses, point B.

Laser peening of metals is used to increase fatigue strength and prevent Stress Corrosion Cracks. An array of high repetition rate, solid state lasers operated either the fundamental wavelength (1.06 microns) or at the second harmonic wavelength (0.532 microns) imparts residual stresses in the metal, with each pulse increasing the depth of penetration. Light from the laser array is transported to the metal using a multimode fiber bundle with terminal optics to reduce the irradiated spot to the value dictated by the flux and fluence requirements of the peening process. Operation at the second harmonic wavelength permits peening under water, an attribute which is important for many applications to nuclear power reactor assemblies.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for laser processing a workpiece, comprising:
    a container containing water with at least a portion of the workpiece under said water,
    a laser unit, said laser unit comprising a multiplicity of individual low pulse energy but high repetition rate lasers that produce low pulse energy but high repetition rate pulses,
    a laser processing unit for processing said workpiece using said low pulse energy but high repetition rate pulses, and
    a fiber optic unit for transmitting said low pulse energy but high repetition rate pulses from said laser unit to said laser processing unit to said at least a portion of the workpiece under said water.

2. The apparatus for laser processing a workpiece of claim 1, wherein said fiber optic unit comprises a multiplicity of optical fibers for transmitting said low pulse energy but high repetition rate pulses to said at least a portion of the workpiece under said water.

3. The apparatus for laser processing a workpiece of claim 1, wherein said laser unit comprises a multiplicity of individual diode pumped solid state low pulse energy but high repetition rate lasers.

4. The apparatus for laser processing a workpiece of claim 1, wherein said laser unit comprises a multiplicity of individual of low pulse energy but high repetition rate lasers that produce low pulse energy but high repetition rate pulses of green wavelength.

5. The apparatus for laser processing a workpiece of claim 3, wherein said laser unit comprises a multiplicity of individual diode pumped solid state low pulse energy but high repetition rate lasers that produce low pulse energy but high repetition rate pulses of green wavelength.

6. The apparatus for laser processing a workpiece of claim 5, wherein said laser unit comprises a multiplicity of individual diode pumped solid state low pulse energy but high repetition rate lasers that produce low pulse energy but high repetition rate pulses of green wavelength and said fiber optic unit comprises a fiber optic bundle of a multiplicity of optical fibers for delivering said low pulse energy but high repetition rate pulses to said at least a portion of the workpiece under said water.

7. The apparatus for laser processing a workpiece of claim 1, wherein said container containing water is a tank that contains water.

8. The apparatus for laser processing a workpiece of claim 7, wherein said workpiece is entirely under said water.

9. The apparatus for laser processing a workpiece of claim 1, wherein said laser processing unit is a laser peening unit.

10. The apparatus for laser processing a workpiece of claim 9, wherein said container containing water is a tank that contains water and said workpiece is entirely under said water.

11. The apparatus for laser processing a workpiece of claim 10, wherein said laser unit comprises a multiplicity of individual diode pumped solid state low pulse energy but high repetition rate lasers that produce low pulse energy but high repetition rate pulses and said container containing water is a tank that contains water and said workpiece is under said water.

12. The apparatus for laser processing a workpiece of claim 11, wherein said laser unit comprises a multiplicity of individual diode pumped solid state low pulse energy but high repetition rate lasers that produce low pulse energy but high repetition rate pulses of green wavelength and said container containing water is a tank that contains water and said workpiece is under said water.

13. The apparatus for laser processing a workpiece of claim 11, wherein said laser unit comprises a multiplicity of individual diode pumped solid state low pulse energy but high repetition rate lasers that produce low pulse energy but high repetition rate pulses of green wavelength that are used to laser peen said workpiece under said water.

14. A laser processing system for processing a workpiece, comprising:
    a container containing water with at least a portion of the workpiece under said water, laser means for producing low pulse energy but high repetition rate pulses, laser processing means for processing said workpiece using said low pulse energy but high repetition rate pulses, and fiber optic means for transmitting said low pulse energy but high repetition rate pulses from said laser means to said laser processing means to said at least a portion of the workpiece under said water.

15. The laser processing system of claim 14, wherein said laser means comprises a multiplicity of individual lasers and said fiber optic means comprises a multiplicity of optical fibers for transmitting said low pulse energy but high repetition rate pulses.

16. The laser processing system of claim 14, wherein said laser means comprises a multiplicity of individual diode pumped solid state low pulse energy but high repetition rate lasers and said fiber optic means comprises a corresponding multiplicity of individual optical fibers for transmitting said low pulse energy but high repetition rate pulses.

17. The laser processing system of claim 14, wherein said laser means comprises an array of low pulse energy but high repetition rate lasers that produce low pulse energy but high repetition rate pulses of green wavelength.

18. The laser processing system of claim 14, wherein said laser means comprises a multiplicity of individual diode pumped solid state low pulse energy but high repetition rate lasers that produce low pulse energy but high repetition rate pulses of green wavelength.

19. The laser processing system of claim 14, wherein said laser means comprises a multiplicity of individual diode pumped solid state low pulse energy but high repetition rate lasers that produce low pulse energy but high repetition rate pulses of green wavelength and wherein said fiber optic means comprises a fiber optic bundle for delivering said low pulse energy but high repetition rate pulses of green wavelength to said workpiece.

20. The laser processing system of claim 14, wherein said container containing water is a tank that contains water.

21. The laser processing system of claim 14, wherein said container containing water is a tank that contains water and said workpiece is under said water.

22. The laser processing system of claim 14, wherein said laser processing means is a laser peening unit.

23. The laser processing system of claim 14, wherein said laser means comprises a multiplicity of individual diode pumped solid state low pulse energy but high repetition rate lasers that produce low pulse energy but high repetition rate pulses of green wavelength and said container containing water is a tank that contains water.

24. The laser processing system of claim 14, wherein said laser means comprises a multiplicity of individual diode pumped solid state low pulse energy but high repetition rate lasers that produce low pulse energy but high repetition rate pulses of green wavelength and said container containing water is a tank that contains water and workpiece is under said water.

25. The laser processing system of claim 14, wherein said laser means produces low pulse energy but high repetition rate pulses of green wavelength.

26. The laser processing system of claim 25, wherein said low pulse energy but high repetition rate pulses of green wavelength are used to laser peen said workpiece under said water.

27. A method of laser processing for processing a workpiece, comprising the steps of:

positioning the workpiece in a container containing water with at least a portion of the workpiece under said water, using a multiplicity of lasers for producing low pulse energy but high repetition rate pulses, using a laser processing unit for processing said workpiece using said low pulse energy but high repetition rate pulses, and using a fiber optic cable for transmitting said low pulse energy but high repetition rate pulses from said laser means to said laser processing means to said at least a portion of the workpiece under said water.

28. The laser processing method of claim 27, wherein said step of using a laser for producing low pulse energy but high repetition rate pulses uses a multiplicity of individual of low pulse energy but high repetition rate lasers and said step of using a fiber optic cable for transmitting said low pulse energy but high repetition rate pulses from said laser means to said laser processing means uses a multiplicity of individual optical fibers for transmitting said pulse energy but high repetition rate pulses to said at least a portion of the workpiece under said water.

29. The laser processing method of claim 27, wherein said step of using a laser for producing low pulse energy but high repetition rate pulses uses a multiplicity of individual lasers and said step of using a fiber optic cable for transmitting said low pulse energy but high repetition rate pulses from said laser means to said laser processing means uses a corresponding multiplicity of individual optical fibers for transmitting said low pulse energy but high repetition rate pulses to said at least a portion of the workpiece under said water.

30. The laser processing method of claim 27, wherein said step of using a laser for producing low pulse energy but high repetition rate pulses uses an array of low pulse energy but high repetition rate lasers.

31. The laser processing method of claim 27, wherein said step of using a laser for producing low pulse energy but high repetition rate pulses produces low pulse energy but high repetition rate pulses of green wavelength.

32. The laser processing method of claim 27, wherein said step of using a fiber optic cable for transmitting said low pulse energy but high repetition rate pulses from said laser means to said laser processing means uses a fiber optic bundle for delivering said low pulse energy but high repetition rate pulses to said workpiece under said water.

33. The laser processing method of claim 27, wherein said step of using a laser processing unit for processing said workpiece using said low pulse energy but high repetition rate pulses uses a multiplicity of individual optical fibers and said step of positioning the workpiece in a container containing water positions the workpiece in a tank containing water using said water to cover at least a portion of said workpiece.

34. The laser processing method of claim 33, wherein said workpiece is under said water.

35. The laser processing method of claim 27, wherein said step of using a laser for producing low pulse energy but high repetition rate pulses is a laser peening unit.

36. The laser processing method of claim 27, wherein said step of using a laser processing unit for processing said workpiece using said low pulse energy but high repetition rate pulses uses a multiplicity of individual optical fibers and said step of positioning the workpiece in a container containing water positions the workpiece in a tank and uses said water to cover at least a portion of said workpiece.

37. The laser processing method of claim 36, wherein said workpiece is positioned entirely under said water.

38. The laser processing method of claim 27, wherein said step of using a laser for producing low pulse energy but high repetition rate pulses pulse produces low pulse energy but high repetition rate pulses of green wavelength.

39. The laser processing method of claim 38, wherein said laser pulse of green wavelength is used to laser peen said workpiece under said water.

* * * * *